(12) United States Patent  (10) Patent No.: US 9,229,749 B2
Chandrasekaran  (45) Date of Patent: Jan. 5, 2016

(54) COMPUTE AND STORAGE PROVISIONING IN A CLOUD ENVIRONMENT

(75) Inventor: Varagur Chandrasekaran, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 604 days.

(21) Appl. No.: 13/317,883

(22) Filed: Oct. 31, 2011

(65) Prior Publication Data

US 2013/0111471 A1  May 2, 2013

(51) Int. Cl.
*G06F 9/455* (2006.01)
*G06F 9/50* (2006.01)
*H04L 29/08* (2006.01)
*G06F 3/06* (2006.01)

(52) U.S. Cl.
CPC .............. *G06F 9/455* (2013.01); *G06F 9/5077* (2013.01); *H04L 67/1097* (2013.01); *G06F 3/067* (2013.01); *G06F 3/0631* (2013.01)

(58) Field of Classification Search
None
See application file for complete search history.

(56) References Cited

U.S. PATENT DOCUMENTS

| | | | |
|---|---|---|---|
| 6,948,044 B1 | 9/2005 | Chandrasekaran | |
| 7,877,466 B2 | 1/2011 | Chandrasekaran | |
| 7,882,283 B2 | 2/2011 | Cometto et al. | |
| 2005/0138308 A1* | 6/2005 | Morishita et al. | 711/162 |
| 2006/0005189 A1* | 1/2006 | Vega et al. | 718/1 |
| 2008/0222375 A1* | 9/2008 | Kotsovinos et al. | 711/162 |
| 2009/0199177 A1* | 8/2009 | Edwards et al. | 718/1 |
| 2009/0276771 A1* | 11/2009 | Nickolov et al. | 717/177 |
| 2010/0235431 A1* | 9/2010 | Poluri et al. | 709/203 |
| 2010/0275058 A1* | 10/2010 | Hashimoto et al. | 714/8 |
| 2011/0239010 A1* | 9/2011 | Jain et al. | 713/310 |
| 2012/0054624 A1* | 3/2012 | Owens et al. | 715/735 |
| 2013/0054813 A1* | 2/2013 | Bercovici et al. | 709/226 |

* cited by examiner

*Primary Examiner* — Dong Kim
(74) *Attorney, Agent, or Firm* — Cindy Kaplan

(57) ABSTRACT

In one embodiment, a method includes receiving at a network device, resource information comprising attributes for compute and storage resources in a network, identifying a need for provisioning a virtual element, and selecting one of the compute and storage resources for use in provisioning the virtual element. Selection of the compute or storage resource includes analyzing the resource information for the compute resources and the storage resources in the network. An apparatus is also disclosed.

20 Claims, 5 Drawing Sheets

COMPUTE AND STORAGE PROVISIONING IN A CLOUD ENVIRONMENT

TECHNICAL FIELD

The present disclosure relates generally to communication networks, and more particularly, to provisioning compute and storage resources in a network.

BACKGROUND

Cloud computing enables network access to a shared pool of configurable resources that can be rapidly provisioned and released with minimum management effort. Compute and storage are the primary resources in a cloud computing environment. With the advent of virtual machines and virtual storage, a method for optimal provisioning of compute and storage elements has become increasingly important and also introduces a number of challenges.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
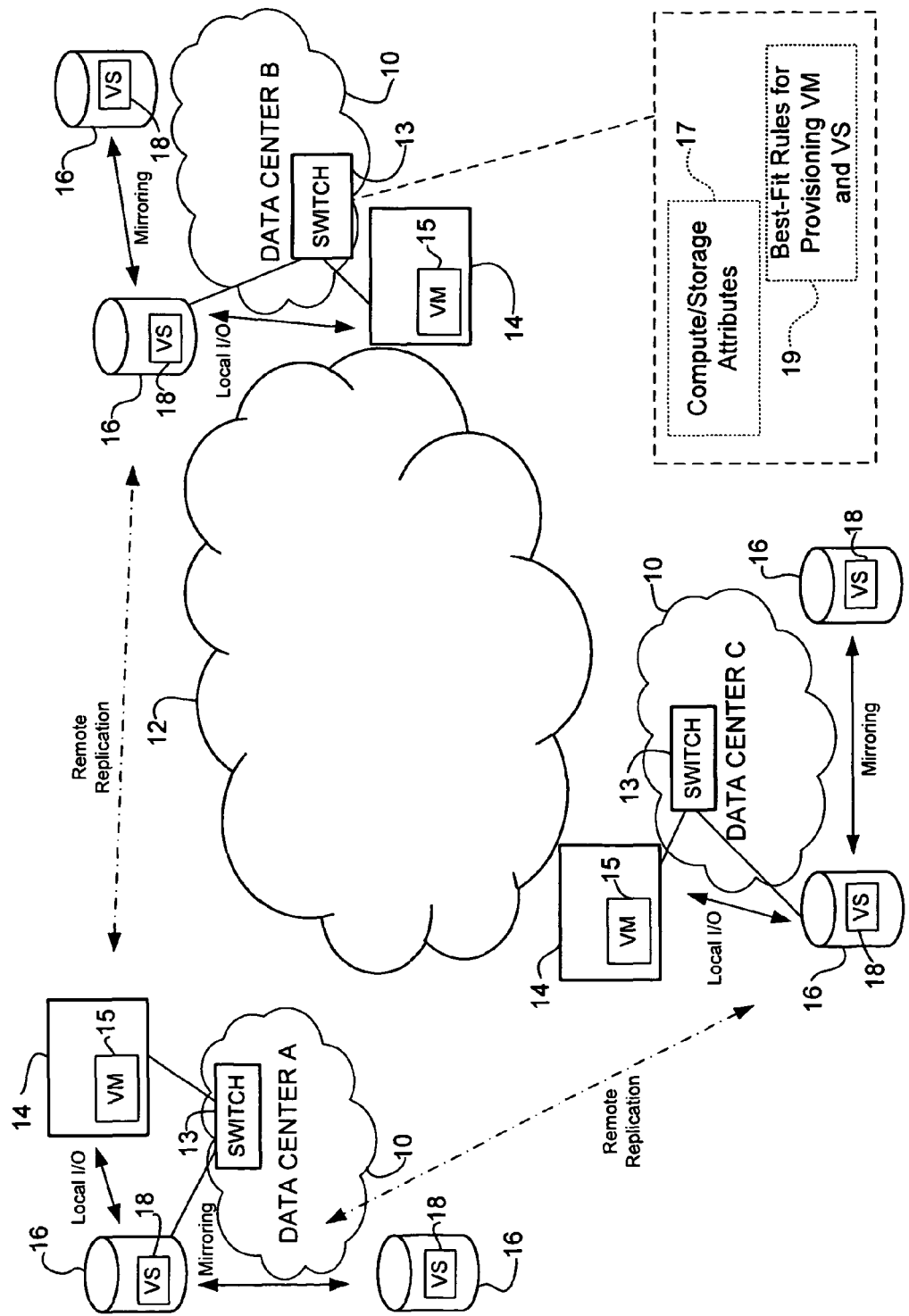
FIG. 1 illustrates an example of a network in which embodiments described herein may be implemented.

In one embodiment, a method generally comprises receiving at a network device, resource information comprising attributes for compute and storage resources in a network, identifying a need for provisioning a virtual element, and selecting one of the compute and storage resources for use in provisioning the virtual element. Selection of the compute or storage resource includes analyzing the resource information for the compute resources and the storage resources in the network.

In another embodiment, an apparatus generally comprises a processor for receiving resource information comprising attributes for compute and storage resources in a network, identifying a need for provisioning a virtual element, and selecting one of the compute and storage resources for use in provisioning the virtual element. The apparatus further includes memory for storing the resource information. The compute or storage resource is selected based on resource information for the compute resources and the storage resources in the network.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Virtualization enables the aggregation of multiple servers, storage infrastructure, and networks into shared resources that can be delivered dynamically to applications as needed. Virtualization provides efficient use of resources, such as compute and storage, in a manner transparent to a user. In one example, virtualization allows one computer to do the job of multiple computers by sharing the resources of a single computer across multiple systems. Software is used to virtualize hardware resources of a computer to create a virtual machine that can run its own operating system and applications. Multiple virtual machines share hardware resources without interfering with each other so that several operating systems and applications can be run at the same time on a single computer. Virtual machines may be used, for example, in a virtual infrastructure to dynamically map physical resources to business needs. The virtual machines may use virtual storage that is carved out of multiple physical storage elements.

Cloud computing is a model that provides resources and services that are abstracted from an underlying infrastructure and provided on demand and at a scale in a multi-tenant environment. In the cloud environment, virtual machines may be provisioned for the first time or after movement (e.g., VMotion) to another compute resource following a compute resource or storage resource failure. Virtual storage may be provisioned for the first time using multiple physical storage elements or following a storage element failure which results in reallocation of the physical storage elements for a given virtual storage. The term 'provision' as used herein may refer to first time provisioning or re-provisioning following a failure, for example.

Conventional virtualization schemes only consider compute resources when provisioning virtual machines, and consider storage resources only when provisioning virtual storage, and therefore often select non-optimal compute and storage resources for provisioning virtual elements. In order to optimally provision virtual machines in a cloud environment, not only do the characteristics of compute resources need to be considered, it is also important to consider storage characteristics. In the case of virtual storage provisioning, not only do the characteristics of storage resources need to be considered, it is also important to consider compute characteristics. If both compute and storage characteristics are not considered, overall system performance for the applicable compute environment will not be optimal.

The embodiments described herein utilize attributes of both compute resources and storage resources when provisioning compute (virtual machines) or storage (virtual storage) to provide optimal performance and redundancy for applications in a cloud environment.

The embodiments operate in the context of a data communication system including multiple network elements. Referring now to the drawings, and first to FIG. 1, an example of a communication system in which embodiments described herein may be implemented is shown. For simplification, only a small number of network elements are shown. In the example of FIG. 1, networks 10 are in communication over network 12 to form a virtual data center in a cloud computing environment. The networks 10 may be configured for use as data centers or any other type of network. The example shown in FIG. 1 includes three data centers (data center A, data center B, data center C) 10. The data centers 10 include compute resources (e.g., servers, hosts, client systems) 14 in communication with physical storage devices 16 via network devices (e.g., switches) 13. There may be any number of data centers 10 within the virtual data center.

The network 12 may include one or more networks (e.g., local area network, metropolitan area network, wide area network, virtual private network, enterprise network, Internet, intranet, radio access network, public switched network, or any other network). The network 12 may include any number or type of network devices (e.g., routers, switches, gateways, or other network devices), which facilitate passage of data over the network.

The data center 10 may be a Fibre Channel (FC) network, Ethernet network, Fibre Channel over Ethernet (FCoE) network, or any other type of network. The data center 10 may include any number of switches 13, hosts 14, storage devices 16, or other network devices. The switch 13 may be, for example, a Fibre Channel switch or any other network device operable to perform switching functions.

The host 14 may be, for example, a server (e.g., blade server, rack server) or any other type of network device operable to host virtual machines (VMs) 15. The hosts 14 perform various operations with storage devices 16, including, for example, reading and writing information to storage devices. For example, the hosts 14 make input/output (I/O) requests that may be transmitted via intervening switches 13 to a target (virtual storage 18). Virtual storage 18 is carved out of multiple physical storage devices 16. For example, the virtual storage 18 may include physical partitions of storage devices 16 that are spread throughout the data center 10.

The storage devices 16 may be a single disk, multiple disk array (e.g., Redundant Array of Independent Disks (RAID)), portion of a disk drive, or a partition of physical storage media. The storage device 16 may comprise, for example, a FC (Fibre Channel) drive or a SAS (Serial Attached SCSI (Small Computer System Interface)) drive comprising a hard disk drive (HDD), solid state drive (SSD), hybrid drive, RAM (Random Access Memory), or any other suitable storage medium. The storage devices 16 may be associated with logical unit numbers (LUNs) and the virtual storage 18 may be associated with virtual LUNs (VLUNs). The VLUNs may span across multiple physical storage drives. The embodiments may be applied to block storage, file storage, or object storage with an associated underlying storage virtualization scheme in place (i.e., block level, file level, object level).

Virtualization and mapping are used to spread data across multiple physical storage elements. The distribution of data across multiple storage elements provides not only data integrity and redundancy, but also data access efficiency. Virtual to physical mapping, mirroring, and striping (described below) are performed at virtualization engines or controllers located in the network.

Virtual storage 18 may be configured to provide mirroring functionality for redundancy, striping functionality for performance, or both striping and mirroring. With disk mirroring, data is written to two or more duplicate disks simultaneously. For example, as shown in FIG. 1, virtual machine 15 writes data to a first storage device 16 associated with virtual storage 18. A mirror copy of the data is sent to a second storage device in the same data center 10. A mirror copy may also be sent to other data centers 10 as indicated by the remote replication arrows in FIG. 1. Since every write or delete operation is done to both physical disks at approximately the same time, the contents of each physical disk are generally identical. In one example, the host 14 may be configured to write a VLUN through a controller, which then mirrors the data across two or more disks. The controller may be located at the switch 13, host 14, or other network device.

Disk striping is a technique for spreading data across multiple physical disk drives to improve performance. Striping can speed up operations that read data from disk storage by allowing multiple parallel data transfers from different physical disks. Instead of waiting for all of the data from a single storage device, the host can access storage devices simultaneously to more efficiently gather data. Having different physical partitions receive data simultaneously is typically more efficient than writing an entire block of data to a single physical partition. In one example, the host 14 is configured to write a VLUN through a controller associated with the virtual storage 18. The controller then stripes the data across two disks to allow simultaneous access.

In the cloud compute environment shown in FIG. 1, each mirror copy of virtual storage 18 exists in remote data centers to provide data center level redundancy across the virtual data center. In addition to data center redundancy, the network may also be configured for switch level, line card level, or link level redundancy.

In one of the embodiments, one of the mirror copies in the data center 10 is identified as a preferred copy based on the associated physical storage characteristics such as locality, speed, etc. Striping is preferably deployed on the preferred copy to provide optimum performance for any application involving that virtual storage 18. One of the non-preferred mirror copies may also be identified as a standby-preferred copy. The standby-preferred copy will be given priority over other non-preferred copies during provisioning of a virtual machine previously associated with the preferred copy of virtual storage.

In one embodiment, one or more of the non-preferred mirror copies of virtual storage deploy journaling of the physical storage for sequential write updates. Journaling may be used to reduce the input/output latency in real-time. For example, input/output status may be delivered to an initiating virtual machine 15 only after receiving applicable input/output status from all mirrored sites. Thus, journaling (sequential input/output) would return faster when compared to a non-journalled mirror copy (random input/output). The non-preferred mirror copies may be configured such that the applicable physical storage resources for a standby preferred copy are continuously updated at that data center site in the background by reading back updated data from journaling physical storage. A background process may be performed at the standby-preferred copy site that would sync that site's mirror copy with journal storage in the background. The other mirror sites may or may not sync journaling transactions to regular mirror copies, depending on the available resources. Journaling physical storage may also be mirrored to provide redundancy in each of the non-preferred mirror copy data center sites. Within the data center 10, for virtual machine moves or marking of virtual storage as a preferred copy, journaling of the physical storage may not be deployed since long distance latency for input/output completion is not an issue within a given data center.

Each switch 13 is configured to receive and store resource information for compute and storage resources within the virtual network. As described below, the resource information comprises compute and storage attributes and relative attributes. The resource information may be discovered by the switch 13 (e.g., requested or automatically sent to the switch 13 from other components in the network) or input by a user. As described in detail below, the switch 13 maintains compute and storage attributes 17 for use in selecting compute and storage resources when provisioning virtual machines 15 or virtual storage 18. Best-fit rules 19 are used for provisioning virtual machines 15 and virtual storage 18 to provide optimum performance and redundancy for applications in the cloud environment while considering attributes of both compute and storage resources available in the virtual data center.

It is to be understood that the network shown in FIG. 1 is only an example and that the embodiments described herein may be implemented in networks having different network topologies and network devices, without departing from the scope of the embodiments.

Figure 2:
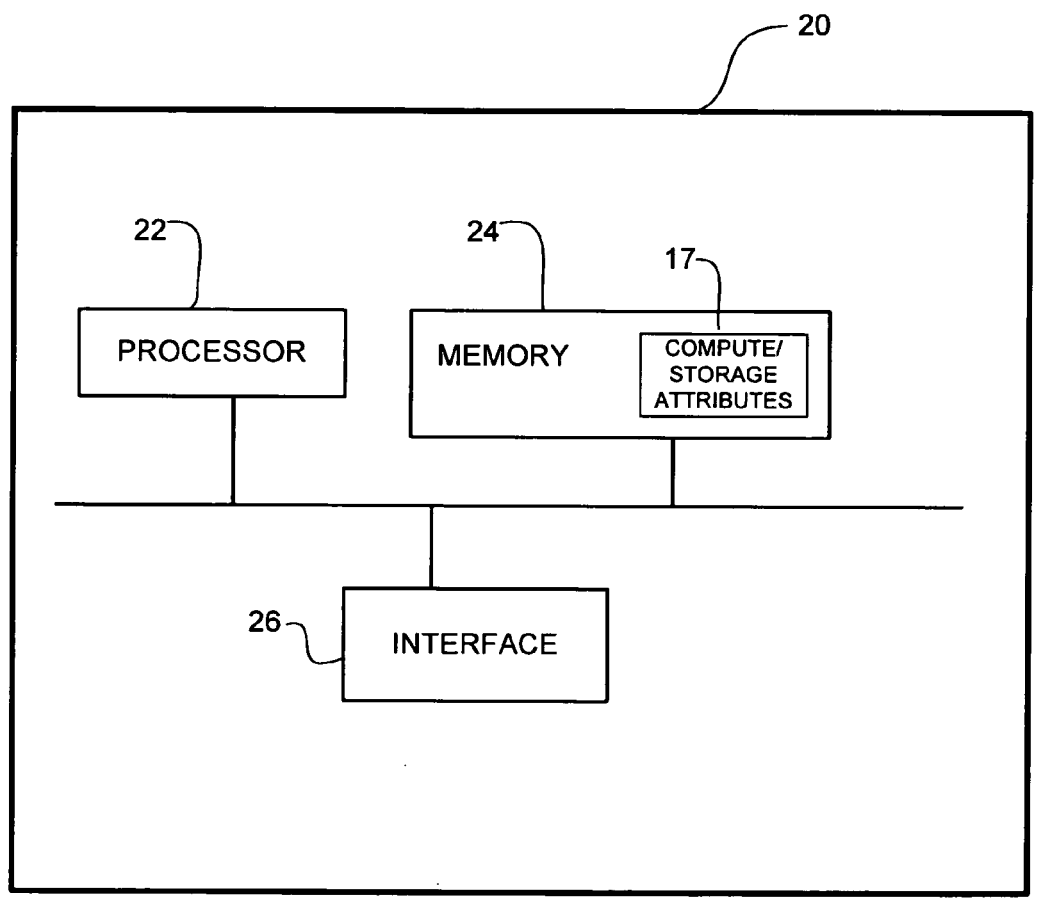
FIG. 2 depicts an example of a network device useful in implementing embodiments described herein.

An example of a network device 20 (e.g., switch) that may be used to implement embodiments described herein is shown in FIG. 2. In one embodiment, network device 20 is a programmable machine that may be implemented in hardware, software, or any combination thereof. The device 20 includes one or more processors 22, memory 24, and network interface 26. Memory 24 may be a volatile memory or non-volatile storage, which stores various applications, modules, and data for execution and use by the processor 22. For example, memory 24 may include resource information (compute/storage attributes) 17 and rules for provisioning virtual machines 15 and virtual storage 18.

Logic may be encoded in one or more tangible computer readable media for execution by the processor 22. For example, the processor 22 may execute codes stored in a computer readable medium such as memory 24. The computer readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network interface 26 may comprise any number of interfaces (linecards, ports) for receiving data or transmitting data to other devices.

It is to be understood that the network device 20 shown in FIG. 2 and described above is only an example and that network devices having different components and configurations may be used without departing from the scope of the embodiments.

Figure 3:
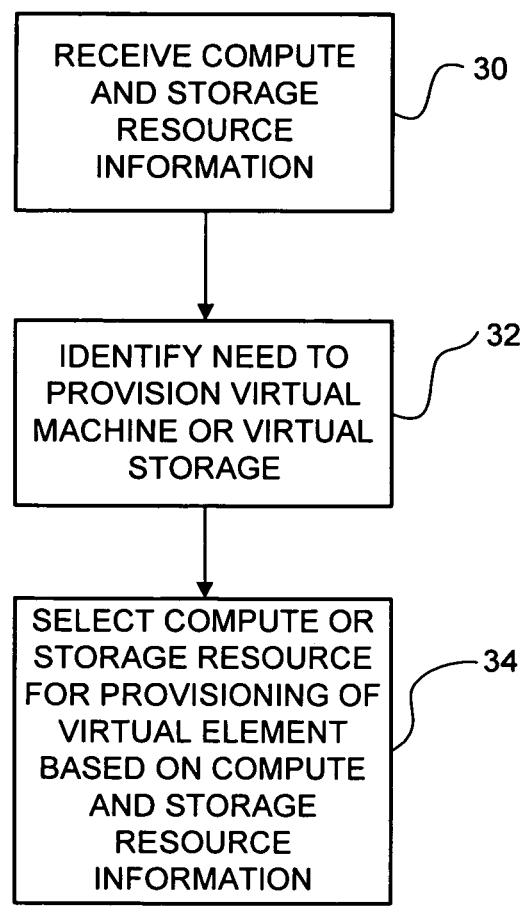
FIG. 3 is a flowchart illustrating an overview of a process for compute and storage provisioning, in accordance with one embodiment.

FIG. 3 is a flowchart illustrating an overview of a process for compute and storage provisioning, in accordance with one embodiment. At step 30 a network device (e.g., switch 13) identifies compute resources 14 and storage resources 16, 18 in the virtual data center and stores resource information (e.g., characteristics, attributes of the resources, network topology, relative attribute information). The resource information may be received from network devices (e.g., switches 13, hosts 14) in the virtual data center or from a user. A need for provisioning a virtual element (e.g., virtual machine 15, virtual storage 18) is identified at step 32. For example, a virtual machine 15 may need to be provisioned for the first time on a compute resource 14 or a compute resource may fail, requiring migration of a virtual machine to another compute resource. In another example, virtual storage 18 may need to be provisioned for the first time using a group of physical storage elements or a storage element may fail, leading to reallocation of physical storage elements for a given virtual storage. One or more virtual machines 15 may also need to be moved to another compute resource following failure of a storage resource.

The resource information for both compute resources and storage resources is used to select a compute or storage resource for use in provisioning the virtual element (step 34). As described in detail below, attributes are used along with best-fit rules to determine the optimum placement of the virtual machine 15 at a compute resource or virtual storage 18 at a storage resource in the virtual data center. Characteristics of both compute and storage resources are used to identify placement of the virtual element to provide optimum system performance. For example, a virtual machine 15 is preferably provisioned on a compute resource 14 in a data center 10 where the virtual storage 18 used by the virtual machine has its preferred mirror copy in the same data center. Virtual storage 18 is preferably provisioned in such a way that a preferred mirror copy is marked and made to exist in the data center 10 where the applicable virtual machine 15 that would use the virtual storage exists.

It is to be understood that the process illustrated in FIG. 3 and described above is only an example and that steps may be modified, added, or combined, without departing from the scope of the embodiments.

The following describes examples of attributes that are maintained by the system for use in selecting the optimum compute or storage resource on which to provision the virtual element (virtual machine 15 or virtual storage 18). In the following examples, there are n compute resources and m virtual storage resources in the network cloud. In one embodiment, the system maintains the following attributes:

RELATIVE_ATTRIBUTE_INFO [n][m]
ABSOLUTE_ATTRIBUTE_INFO [n]
ABSOLUTE_ATTRIBUTE_INFO [m]

The RELATIVE_ATTRIBUTE_INFO includes network topology information such as: a) inter-node distance (e.g., hops); b) inter-node resiliency (e.g., number of parallel reachable paths); and c) inter-node latency (e.g., measured in real time by network devices hosting compute and virtual storage resources). The relative location of the virtual machine 15 to the virtual storage 18 is an important consideration in selecting the compute or storage resource. A path redundancy metric between the virtual machine and virtual storage is used to identify multiple paths from the virtual machine to virtual storage. Multiple paths are preferred over a single path between the virtual machine and virtual storage for resiliency and to provide increased fabric bandwidth for input/output processes.

Examples of compute ABSOLUTE_ATTRIBUTE_INFO [n] include: a) compute horsepower (e.g., measured in a normalized fashion); b) average compute load (e.g., CPU utilization measured in real-time via a standard MIB (management information base)); c) average memory load (e.g., measured in real-time via a standard MIB); and d) the data center in which the compute resource resides.

Examples of storage ABSOLUTE_ATTRIBUTE_INFO [m] include: a) performance factor (e.g., measured in a normalized manner to indicate striping capacity configured for the virtual storage); b) redundancy factor (e.g., measured in a normalized fashion to indicate mirroring capacity configured for the virtual storage); and c) the data center in which the virtual storage resides. The virtual storage's underlying physical storage performance and reliability may be used in selecting the preferred copy for virtual machine use during provisioning.

Some of the above attributes are static and some are dynamic (i.e., updated in real-time). Depending upon the user's preference, each of the attributes may also carry a weight indicating a priority of an attribute for use in selecting the compute or storage resource for provisioning the virtual element.

The following is an implementation example for compute resources c and virtual storage resources s using the above metrics:

```
M= <current-vStorage-index>;
for (EACH_COMPUTE_RESOURCE_IN_CURRENT_DC_OR_ANOTHER_DC) {
   MEASURE1 = compute_weighted_attribute_measure (
      RELATIVE_ATTRIBUTE_INFO [c] [M]);
   MEASURE2 = compute_weighted_attribute_measure (
      ABSOLUTE_ATTRIBUTE_INFO [c]);
   If (is_measure_better_than_current (MEASURE1,
         current_measure1) &&
      is_measure_better_than_current (MEASURE2,
         current_measure2)) {
      PROVISION_VM_ON_CHOSEN_COMPUTE_RESOURCE (c);
      RETURN;
   }
}
```

Figure 4:
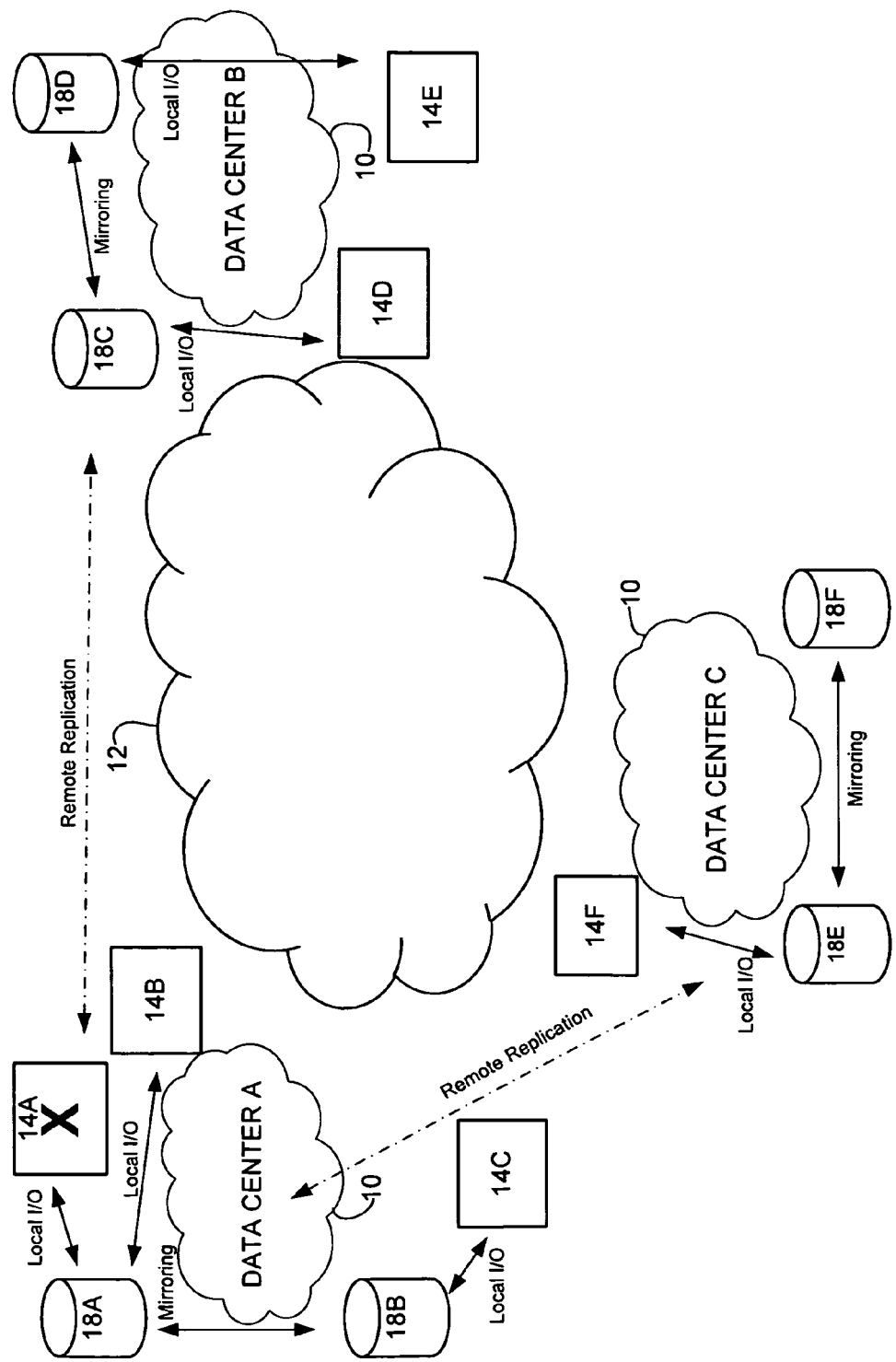
FIG. 4 illustrates examples for virtual machine provisioning following failure of a compute resource in the network of FIG. 1.
Figure 5:
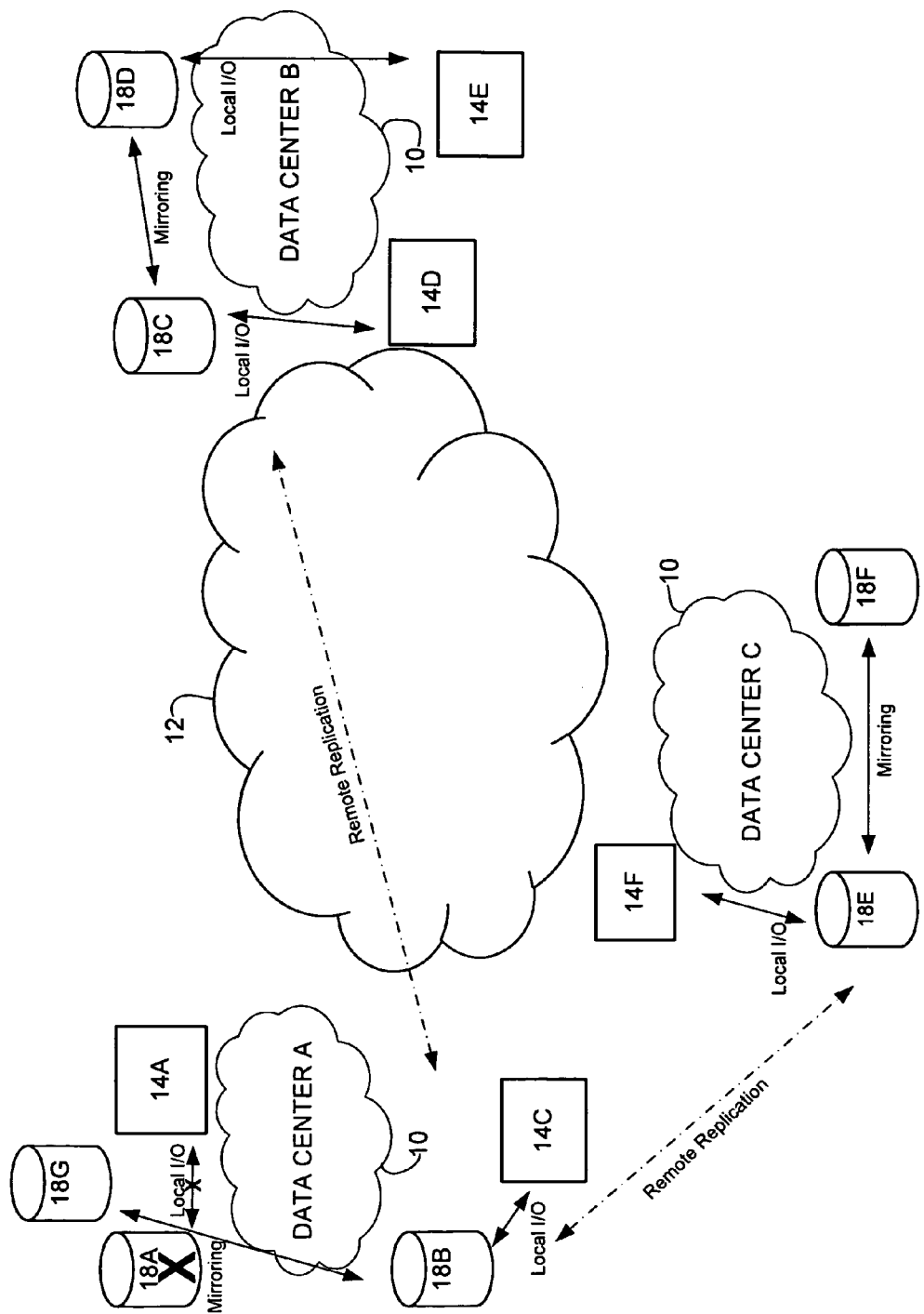
FIG. 5 illustrates examples for virtual machine provisioning following failure of a storage resource in the network of FIG. 1.

The following describes examples of rules for provisioning a virtual machine 15 on a new compute resource 14 either due to compute resource failure or storage failure. FIG. 4 illustrates virtual machine provisioning following a failure of a compute resource and FIG. 5 illustrates virtual machine provisioning following failure of a storage resource.

Referring first to FIG. 4, a plurality of compute resources are shown in the virtual data center. Data center A includes compute resources 14A, 14B, 14C, data center B includes compute resources 14D, 14E, and data center C includes compute resource 14F. Virtual machines (not shown) installed at compute resources 14A and 14B input data to virtual storage 18A, which is mirrored at virtual storage 18B in data center A, and replicated at virtual storage 18C in data center B and virtual storage 18E in data center C. A virtual machine installed at compute resource 14C inputs data to virtual storage 18B, compute resource 14D inputs data to virtual storage 18C, compute resource 14E inputs data to virtual storage 18D, and compute resource 14F inputs data to virtual storage 18E.

In a first example, a failure occurs at compute resource 14A. A virtual machine operating at compute resource 14A therefore needs to be moved to a new compute resource. The virtual machine is preferably provisioned on a compute resource in data center A in which the virtual storage 18A used by the virtual machine has its preferred copy in the data center. An attempt is made to instantiate the virtual machine on compute resource 14B within the same data center using the current virtual storage resource 18A as a reference point. The compute resource 14B is chosen based on the best-fit criteria after analyzing RELATIVE_ATTRIBUTE_INFO and ABSOLUTE_ATTRIBUTE_INFO of the current virtual storage 18A.

If a compute resource using the same virtual storage 18A is not available, an attempt is made to instantiate the virtual machine on a compute resource within the same data center using the mirror virtual storage resource 18B as a reference point. Compute resource 14C is chosen based on the best fit criteria after analyzing RELATIVE_ATTRIBUTE_INFO and ABSOLUTE_ATTRIBUTE_INFO of the mirror virtual storage 18B.

If virtual storage is not available in the same data center A, an attempt is made to instantiate the virtual machine on a compute resource in another data center (e.g., data center B, data center C). A data center is preferably chosen in which either another virtual storage exists with a preferred copy in the data center or the mirror copy of the original virtual storage in that data center is marked as preferred and journaling physical storage is enabled on all other non-preferred mirror copies in other data centers. For example, an attempt may be made to instantiate the virtual machine on compute resource 14D in data center B using the replicated virtual storage resource 18C as the reference point. Compute resource 14D is chosen based on the best-fit criteria after analyzing RELATIVE_ATTRIBUTE_INFO and ABSOLUTE_ATTRIBUTE_INFO of replicated virtual storage 18C.

If the virtual machine cannot be provisioned on compute resource 14D (or other compute resources associated with replicated virtual storage 18C or 18E), an attempt is made to instantiate the virtual machine using the replicated mirror virtual storage resource 18D as the reference point. Compute resource 14E is chosen based on the best-fit criteria after analyzing RELATIVE_ATTRIBUTE_INFO and ABSOLUTE_ATTRIBUTE_INFO of replicated mirror virtual storage 18D.

The following describes examples for provisioning a virtual machine following a failure of storage resource 18A as shown in FIG. 5. Prior to the failure, the virtual machine is operating at compute resource 14A, which has a preferred copy at virtual storage 18A. When a failure occurs in the preferred copy of virtual storage 18A, the virtual machine 14A utilizing that virtual storage needs to be provisioned on another compute resource. The new virtual storage associated with the provisioned virtual machine is marked as a preferred mirror copy and enabled in the data center 10.

The following describes an intra-data center virtual machine move for a virtual storage failure at 18A. First, an attempt is made to instantiate the virtual machine on another compute resource within the same data center using the mirror virtual storage resource 18B as the reference point. The compute resource 14C is chosen based on the best-fit criteria after analyzing RELATIVE_ATTRIBUTE_INFO and ABSOLUTE_ATTRIBUTE_INFO of mirror virtual storage 18B. In order to provide redundancy in data center A, a mirror copy of the data from virtual storage 18B is created at virtual storage 18G.

If the intra-data center virtual machine move attempt does not succeed, an attempt is made to instantiate the virtual machine on a compute resource in another data center (e.g., data center B in FIG. 5). Compute resource 14D is chosen based on the best-fit criteria after analyzing RELATIVE_ATTRIBUTE_INFO and ABSOLUTE_ATTRIBUTE_INFO of replicated virtual storage 18C.

If compute resource 14D is not available, an attempt is made to instantiate the virtual machine on a compute resource using replicated mirror virtual storage resource 18D as the reference point. Compute resource 14E is chosen based on the best-fit criteria after analyzing RELATIVE_ATTRIBUTE_INFO and ABSOLUTE_ATTRIBUTE_INFO of replicated mirror virtual storage 18D.

As can be observed from the foregoing, attribute information for compute and storage resources, including relative attribute information between the compute and storage resources, is used to select an optimum compute or storage resource for use in provisioning a virtual element. Attribute weights and best-fit rules may be used to provide optimum placement in the network (e.g., at compute resource using same virtual storage, in same data center, at compute resource using standby-preferred virtual storage or replicated storage, etc.). This allows the system to maintain remote replication of virtual storage between remote data centers and provide system redundancy. Also, by using a preferred copy, standby-preferred copy, or other mirror copy, data is immediately available to the virtual machine following a move to a new compute resource. In the event of a virtual machine migration, access to virtual storage with the same content is available from the mirrored or replicated copy, while maintaining the input/output performance requirements of the virtual machine.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
   receiving at a network device, resource information comprising attributes for compute resources and storage resources in a network;
   storing said compute resources attributes and said storage resources attributes;
   identifying a need for provisioning a virtual element comprising a virtual machine or virtual storage; and
   selecting one of said compute and storage resources for use in provisioning said virtual element;
   wherein selecting one of said compute and storage resources comprises analyzing said resource information for said compute resources and said storage resources in the network such that said attributes for said compute resources and said storage resources are used to identify optimum placement of the virtual element, said resource information comprising network topology information identifying relative attributes for said compute resources and said storage resources, said relative attributes comprising a path redundancy metric between the virtual machine and the virtual storage for identifying multiple paths from the virtual machine to the virtual storage.

2. The method of claim 1 wherein the network comprises a virtual data center comprising a plurality of data centers and wherein each of said data centers maintains a copy of data maintained in said other data centers.

3. The method of claim 1 wherein said resource information for said storage resources comprises virtual storage attributes identifying a preferred copy of mirrored data.

4. The method of claim 1 wherein the network comprises a plurality of networks in a cloud environment, each of said networks comprising a mirror copy of data stored at other networks, and wherein selecting one of said compute and storage resources comprises selecting said compute resources or selecting said storage resources to maintain remote replication of virtual storage between said networks.

5. The method of claim 1 wherein said virtual element comprises the virtual machine and identifying a need for provisioning said virtual element comprises identifying a need to move the virtual machine from a first compute resource to a new compute resource.

6. The method of claim 5 wherein selecting said new compute resource comprises selecting one of said compute resources utilizing the same virtual storage as said first compute resource.

7. The method of claim 5 wherein selecting said new compute resource comprises selecting one of said compute resources located within the same data center as said first compute resource.

8. The method of claim 5 wherein selecting said new compute resource comprises selecting one of said compute resources utilizing a virtual storage comprising a preferred copy of data stored in virtual storage utilized by said first compute resource.

9. The method of claim 1 wherein said virtual element comprises the virtual storage and selecting said storage resources comprises identifying a preferred copy of the virtual storage at one of said storage resources utilized by a specified virtual machine.

10. The method of claim 1 wherein said virtual element comprises virtual storage and further comprising provisioning a virtual machine on one of said compute resources using said provisioned virtual machine and identifying said provisioned virtual storage as a preferred copy.

11. The method of claim 1 wherein analyzing said resource information comprises utilizing attribute weights and best-fit rules.

12. The method of claim 1 wherein said network topology information comprises one or more of inter-node distance, inter-node resiliency, and inter-node latency.

13. The method of claim 1 wherein said relative attributes comprises relative location of the virtual machine to the virtual storage.

14. The method of claim 1 wherein said resource information comprises power and load attributes for said compute resources, and performance and redundancy attributes for said storage resources.

15. An apparatus comprising:
    a physical processor for receiving resource information comprising attributes for compute resources and storage resources in a network, identifying a need for provisioning a virtual element comprising a virtual machine or virtual storage, and selecting one of said compute and said storage resources for use in provisioning said virtual element; and
    a physical storage device for storing said resource information;
    wherein one of said compute and storage resources is selected based on resource information for said compute resources and said storage resources in the network such that said attributes for said compute resources and said storage resources are used to identify optimum placement of the virtual element, said resource information comprising network topology information identifying relative attributes for said compute resources and said storage resources, said relative attributes comprising a path redundancy metric between the virtual machine and the virtual storage for identifying multiple paths from the virtual machine to the virtual storage.

16. The apparatus of claim 15 wherein the network comprises a virtual data center comprising a plurality of data centers and wherein each of said data centers maintains a copy of data maintained in other data centers.

17. The apparatus of claim 15 wherein said virtual element comprises the virtual machine and identifying a need for provisioning said virtual element comprises identifying a need to move the virtual machine from a first compute resource to a new compute resource.

18. The apparatus of claim 15 wherein said virtual element comprises the virtual storage and selecting said storage resources comprises identifying a preferred copy of the virtual storage at one of said storage resources utilized by a specified virtual machine.

19. The apparatus of claim 15 wherein said virtual element comprises the virtual storage and wherein the processor is further configured to provision the virtual machine on one of said compute resources using said provisioned virtual storage and identify said provisioned virtual storage as a preferred copy.

20. One or more non-transitory computer readable media comprising logic encoded thereon, when executed by a processor operable to:
- store resource information comprising attributes for compute resources and storage resources in a network;
- identify a need for provisioning a virtual element comprising a virtual machine or virtual storage; and
- select one of said compute and storage resources for use in provisioning said virtual element;
- wherein one of said compute and storage resources is selected based on resource information for said compute resources and said storage resources in the network such that said attributes for said compute resources and said storage resources are used to identify optimum placement of the virtual element, said resource information comprising network topology information identifying relative attributes for said compute resources and said storage resources, said relative attributes comprising a path redundancy metric between the virtual machine and the virtual storage for identifying multiple paths from the virtual machine to the virtual storage.

* * * * *